United States Patent
Weber et al.

(10) Patent No.: US 9,569,913 B2
(45) Date of Patent: Feb. 14, 2017

(54) SELF-ALIGNING TERMINATION FOR MEMORY ALLOY WIRE

(71) Applicant: CAREFUSION 303, INC., San Diego, CA (US)

(72) Inventors: Frank Dean Weber, San Diego, CA (US); Henricus Mark Ruyten, Gumpoldskirchen (AT); Thomas Kmetiko, Vienna (AT)

(73) Assignee: CAREFUSION 303, INC., San Diego, CA (US)

( * ) Notice: Subject to any disclaimer, the term of this patent is extended or adjusted under 35 U.S.C. 154(b) by 371 days.

(21) Appl. No.: 14/165,378

(22) Filed: Jan. 27, 2014

(65) Prior Publication Data

US 2014/0144925 A1 May 29, 2014

Related U.S. Application Data

(63) Continuation of application No. 13/012,736, filed on Jan. 24, 2011, now Pat. No. 8,635,868.

(51) Int. Cl.
*G07F 11/62* (2006.01)
*F03G 7/06* (2006.01)

(52) U.S. Cl.
CPC .............. *G07F 11/62* (2013.01); *F03G 7/065* (2013.01)

(58) Field of Classification Search
CPC ................................ F03G 7/065; B21F 15/06
USPC .................................................. 60/527–529
See application file for complete search history.

(56) References Cited

U.S. PATENT DOCUMENTS

| | | | | |
|---|---|---|---|---|
| 5,396,769 A | * | 3/1995 | Brudnicki | F03G 7/065 60/527 |
| 5,865,418 A | * | 2/1999 | Nakayama | G05D 23/026 251/11 |
| 6,116,461 A | | 9/2000 | Broadfield et al. | |
| 6,338,007 B1 | | 1/2002 | Broadfield et al. | |
| 6,374,608 B1 | * | 4/2002 | Corris | F03G 7/065 60/527 |

(Continued)

FOREIGN PATENT DOCUMENTS

| CN | 1571882 A | 1/2005 |
|---|---|---|
| CN | 101532400 A | 9/2009 |
| CN | 202300883 U | 7/2012 |

OTHER PUBLICATIONS

International Search Report and Written Opinion for Application No. PCT/US2012/022245, dated Sep. 19, 2012, 7 pages.

(Continued)

*Primary Examiner* — Thomas Denion
*Assistant Examiner* — Mickey France
(74) *Attorney, Agent, or Firm* — McDermott Will & Emery LLP

(57) ABSTRACT

A self-aligning memory alloy wire actuator has a memory alloy wire having first and second ends with at least one terminal coupled to one end of the memory alloy wire. The terminal includes two wings and an extended piece connected in the shape of a T. The two wings are disposed on opposite sides of the extended piece and perpendicular to the extended piece. Each wing comprises top and bottom surfaces, a front surface, and an outside end. The top surfaces of the two wings lie on a common top plane and the front surfaces of the two wings lie on a common front plane. The memory alloy wire is coupled to the extended piece of the terminal.

20 Claims, 7 Drawing Sheets

(56) References Cited

U.S. PATENT DOCUMENTS

| | | | | |
|---|---|---|---|---|
| 8,635,868 | B2* | 1/2014 | Weber | G07F 11/62 |
| | | | | 140/105 |
| 2004/0111179 | A1* | 6/2004 | Broadfield | A61G 12/001 |
| | | | | 700/214 |
| 2005/0282444 | A1* | 12/2005 | Irish | H01R 11/22 |
| | | | | 439/853 |
| 2006/0185359 | A1* | 8/2006 | Hamaguchi | B21C 47/003 |
| | | | | 60/527 |
| 2009/0133398 | A1* | 5/2009 | Hamaguchi | F03G 7/065 |
| | | | | 60/527 |
| 2010/0119863 | A1* | 5/2010 | Bogursky | H01R 4/188 |
| | | | | 428/603 |

OTHER PUBLICATIONS

Chinese First Office Action for Application No. 2011101937357, dated Jul. 20, 2015, 7 pages.

\* cited by examiner

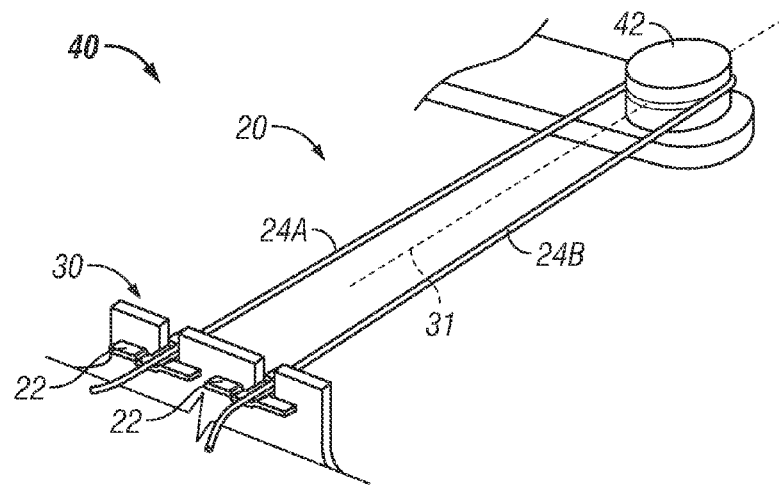
FIG. 8
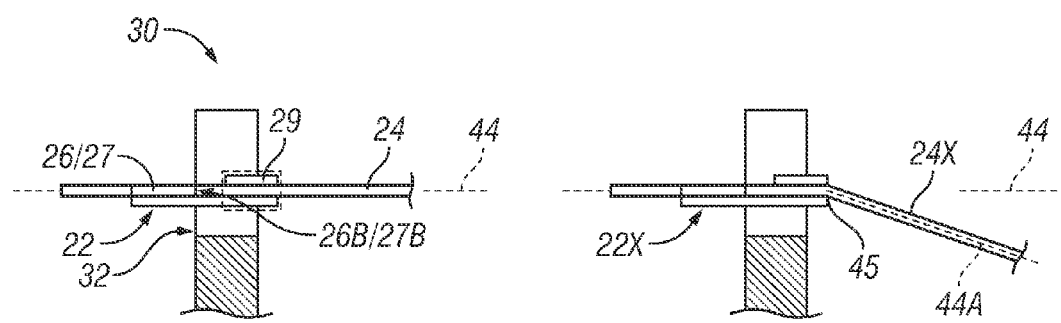
FIG. 9A          FIG. 9B
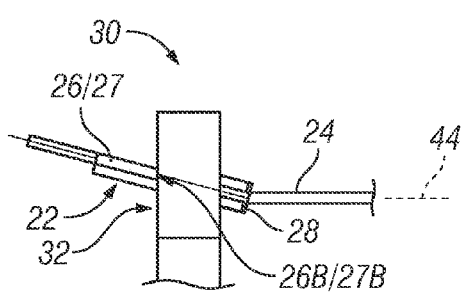     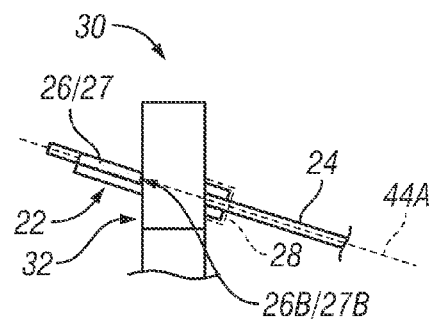
FIG. 9C          FIG. 9D

SELF-ALIGNING TERMINATION FOR MEMORY ALLOY WIRE

CROSS-REFERENCE TO RELATED APPLICATIONS

The present application is a continuation of U.S. Application Ser. No. 13/012,736, filed Jan. 24, 2011, U.S. Pat. No. 8,635,868, entitled, "SELF-ALIGNING TERMINATION FOR MEMORY ALLOY WIRE."

FIELD OF THE INVENTION

The present disclosure generally relates to systems and methods of actuation, and, in particular, relates to the actuators utilizing memory alloy wire.

DESCRIPTION OF THE RELATED ART

Providing secure storage frequently requires a container with a lid that is released only after certain requirements are met, such as verification that the individual accessing the container is authorized to do so. Systems of this type use an actuator of some type to release a latch that otherwise retains the lid in the closed position. Common actuators include solenoids and motors, both of which may be relatively large compared to the usable volume of the container, which decreases the volumetric efficiency of the container.

Actuators that utilize memory alloy wire can provide sufficient power and stroke to release the latch of a secure container while occupying less volume than a solenoid or motor. Memory alloy wire, also known as "muscle wire," is made from one of a number of alloys that contract in length when heated and can be stretched back to their original length when cooled back to room temperature. Example alloys include nickel-titanium alloys that were first developed by the US Naval Ordnance Laboratory and commercialized under the trade name Nitinol (taken from the words NIckel TItanium Naval Ordnance Laboratories). The memory alloy wire is commonly heated by passing an electric current through the wire, creating heat within the wire due to the internal resistance of the wire.

When used as an actuator, a length of memory alloy wire typically has a terminal attached to each end of the wire. Commonly available memory alloy wire actuators have terminals that attach to posts on printed circuit board assemblies (PCBAs) and serve as the electrical contact for the current that heats the memory alloy wire as well as the mechanical attachment. The PCBA is then mounted to the same structure to which the other elements of the actuator are attached, adding another assembly tolerance to the system. One drawback of current memory alloy wire actuators is that shape memory strain is typically limited to 5%, which translates to a maximum stroke of 0.100 inches for a 2 inch actuator. This stroke can easily be consumed by the sum of multiple assembly tolerances, leaving little usable stroke for the actual release function. An additional drawback is that the memory alloy is sensitive to fatigue at points of stress concentration due to bends in the wire at the point of electrical termination.

U.S. Pat. No. 6,116,461, Method and Apparatus for the Dispensing of Drugs, Broadfield et al., discloses an Automated Dispensing Machine (ADM) that utilizes a memory alloy wire actuator. While this system was a significant advance in the dispensing of medications, the memory wire is directly and rigidly attached to the PCBA as described above. As such, the memory alloy wire actuator does not reach its full potential.

SUMMARY

In order to provide a more robust and reliable actuator, it is advantageous to provide a memory alloy actuator having terminals that self-align with the memory alloy wire, thereby reducing the bending stress on the memory alloy wire and increasing the life of the actuator, and provide for mounting directly to the body of the container, thereby reducing the tolerance stack of the assembly. The disclosed system includes a memory wire actuator incorporating self-aligning terminals that provide such benefits.

A memory alloy wire actuator is disclosed that comprises a memory alloy wire having first and second ends with at least one terminal coupled to one end of the memory alloy wire. The terminal includes two wings and an extended piece connected in the shape of a T. The two wings are disposed on opposite sides of the extended piece and perpendicular to the extended piece. Each wing comprises top and bottom surfaces, a front surface, and an outside end. The top surfaces of the two wings lie on a common top plane and the front surfaces of the two wings lie on a common front plane. The memory alloy wire is coupled to the extended piece of the terminal.

A memory wire actuator assembly is disclosed that comprises a memory alloy wire actuator and a retention feature. The memory alloy wire actuator comprises a memory alloy wire and at least one terminal coupled to one end of the memory alloy wire. The memory alloy wire has first and second ends. The terminal has two wings and an extended piece connected in the shape of a T. The two wings are disposed on opposite sides of the extended piece and are perpendicular to the extended piece. Each wing has top and bottom surfaces, a front surface, and an outside end. The top surfaces of the two wings lie on a common top plane and the front surfaces of the two wings lie on a common front plane. The memory alloy wire is coupled to the extended piece of the terminal. The retention feature comprises a planar surface and a notch that passes through the planar surface. The front surfaces of the wings of the terminal contact the planar surface of the retention feature such that the extended piece of the terminal passes through the notch.

A self-aligning terminal is disclosed that comprises a cross-piece having a center and two wings connected to the center and extending in opposite directions from the center. The wings each comprise a top surface that lie in a common top plane. An extended piece is connected to the center of the cross-piece and extends perpendicular to the wings. Each wing further comprises a front surface facing towards the extended piece wherein the front surfaces of the two wings lie in a common front plane. The extended piece is configured to couple to a memory alloy wire at a point separated from the common front plane.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 8 illustrates an exemplary memory alloy wire actuator assembly acting on an actuation element according to certain aspects of this disclosure.

FIGS. 9A-9D illustrate the operation of a self-aligning terminal of a memory alloy wire actuator assembly according to certain aspects of this disclosure.

DETAILED DESCRIPTION

The disclosed embodiments of memory alloy wire systems provide a self-aligning capability for the memory alloy wire that reduces bending stresses and increases the operational life of the actuator.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of a container having a lid with a hook that is retained by a release mechanism. It will be apparent to those of ordinary skill in the art that the disclosed concepts may be applied to a variety of mechanisms utilizing memory alloy wire. Nothing in this disclosure should be interpreted, unless specifically stated as such, to limit the application of any method or system disclosed herein to latch or closure mechanisms.

Figure 1:
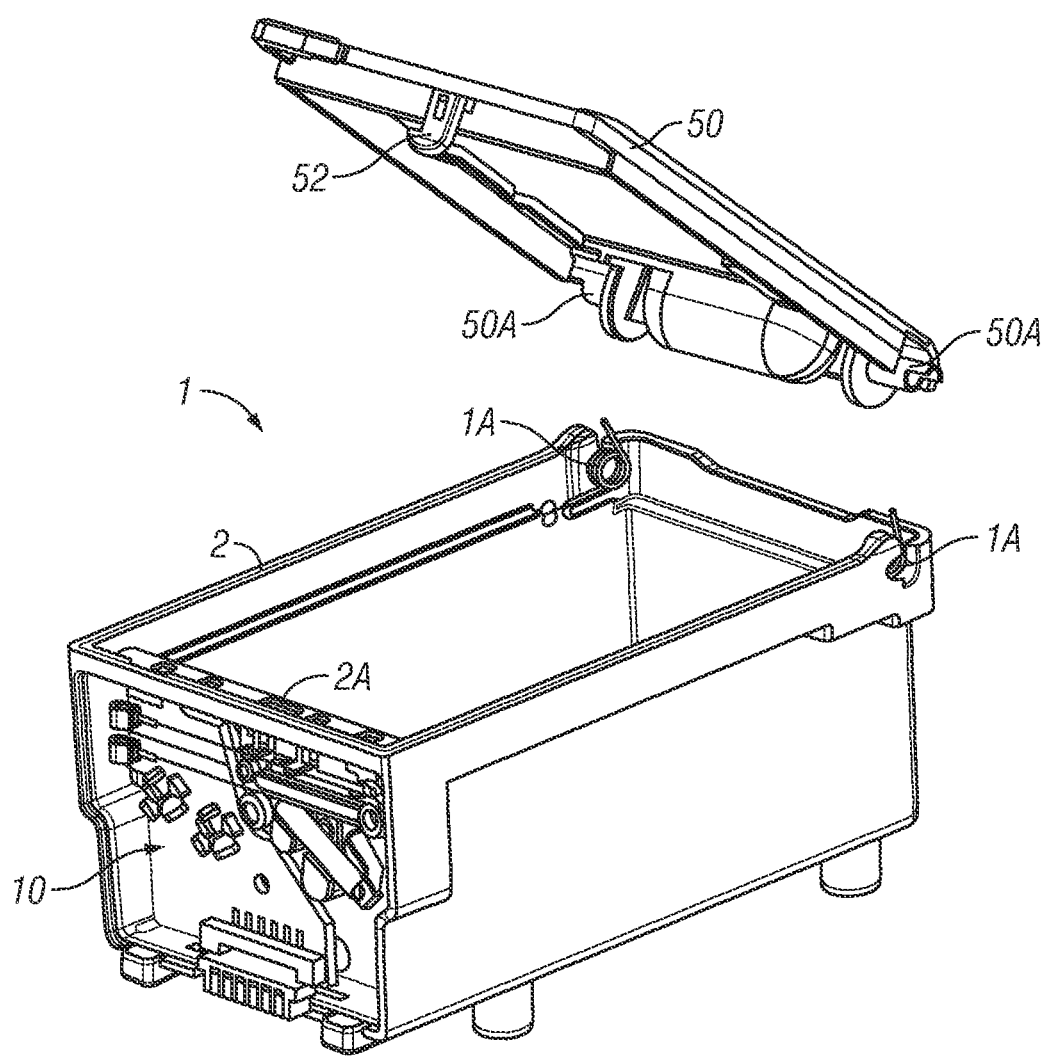
FIG. 1 is a partially exploded view of a lidded container according to certain aspects of this disclosure.

FIG. 1 is a partially exploded view of a lidded container 1 according to certain aspects of this disclosure. The container 1 comprises a body 2 and a lid 50 that is hingedly attached to body 2 through engagement of pivot pins 50A with the pin capture features 1A. When the lid 50 is closed, lid hook 52 passes through the hole 2A in body 2 and comes into proximity with the latch release mechanism 10 that is visible in FIG. 1 within a front compartment of body 2 (a front cover plate of body 2 has been omitted to make visible the latch release mechanism 10).

Figure 2:
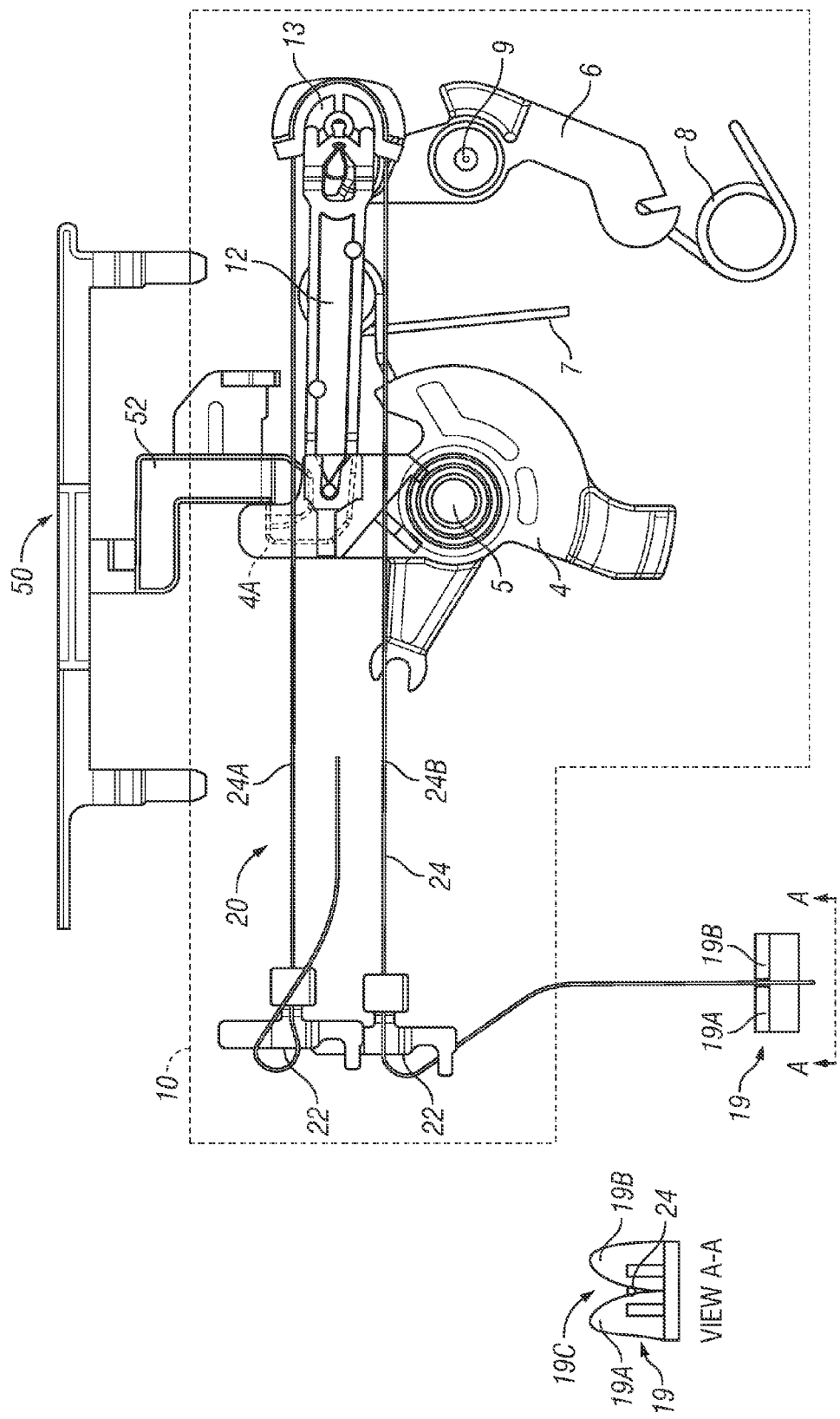
FIG. 2 depicts a lid release mechanism according to certain aspects of this disclosure.

FIG. 2 depicts the latch release mechanism 10 according to certain aspects of this disclosure. The latch release mechanism 10 is configured to retain lid 50 in a closed position when in the position shown in FIG. 2. The fixed elements of latch release mechanism 10 are attached to body 2 (not shown in this view) and therefore fixed in position and orientation relative to the lid 50 and to each other. Latch lever 4 has rotated in a clockwise direction about a fixed pivot 5 such that latch hook 4A, which is located on the end of one of the arms of latch lever 4, has engaged the lid hook 52. Spring 7 applies a force to latch lever 4 that causes a clockwise torque about pivot 5 to be applied to latch lever 4, maintaining the latch lever 4 in the position shown in FIG. 2.

The latch release mechanism 10 includes a memory alloy wire actuator 20 which wraps around capstan 13. Capstan 13 is in contact with one end of plunger 12, the other end of plunger 12 being in contact with latch lever 4. The terminals 22 of memory alloy wire actuator 20 are mounted to the body 2, with details of the mounting discussed in relation to later figures. The length of memory alloy wire actuator 20 limits the range of travel of capstan 13 to the right, which then limits the motion of plunger 12 and consequently the clockwise rotation of latch lever 4. The torque applied by spring 7 causes the latch lever 4 to rotate clockwise until it reaches this limit. The mounting location of terminals 22 and the dimensions of capstan 13, plunger 12, and latch lever 4 are chosen to cause the latch hook 4A to be in this "latched" position, wherein latch hook 4A is engaged with latch hook 52 without applying a lateral force to the latch hook 52. When in the latched position, the torque applied by spring 7 applies a force to plunger 12 and thereby to capstan 13, which then transfers this force to the memory alloy wire 24 of the memory alloy wire actuator 20, placing the memory alloy wire 24 in tension.

FIG. 2 also depicts how the memory alloy wires 24 are electrically connected. One of the memory alloy wires 24 is shown connected to electrical terminal 19. Electrical terminal 19, in this embodiment, is a solderless compression connector wherein the two arms 19A and 19B are formed with a slot 19C between them, as seen in the view A-A of FIG. 2. The width of the slot 19C is less than the diameter of memory alloy wire 24. Arms 19A and 19B are made of a conductive material and are formed such that they have a low spring constant in the direction perpendicular to slot 19C. The electrical connection is made by sliding memory alloy wire 24 sideways into the slot 19C, which deforms both arms 19A and 19B placing the memory alloy wire 24 in compression between the arms 19A and 19B. This compressive contact is sufficient to form a conductive bond between the arms 19A, 19B and the memory alloy wire 24. If a voltage is created between electrical terminal 19 and a similar electrical terminal (not shown) connected to the other end of memory alloy wire 24, a current will flow through the memory wire 24, heating the memory alloy wire 24 and causing the memory alloy wire 24 to contract. In certain embodiments, this electrical contact is accomplished with any of a plurality of electrical contact terminals known to those of skill in the art, including screw terminals and solder terminals.

The latch release mechanism 10 also includes a cantilever 6 that rotates about a fixed pivot 9. While the configuration of cantilever 9 is discussed here, the purpose of cantilever 9 is disclosed in discussion of later figures. At one end, cantilever 9 engages a feature of plunger 12 at the same point that plunger 12 contacts capstan 13. A cantilever spring 8 applies a force to the other end of cantilever 9. This force creates a clockwise torque about the pivot 9, which rotates cantilever 6 about the pivot causing the first end to push plunger 12 towards the capstan 13 which is constrained from further lateral motion by the memory alloy wire actuator 20. The force applied by cantilever 6 to plunger 12 is applied parallel to and additive with the force applied by latch lever 4 to the plunger 12 and the sum of these forces is applied to capstan 13.

The latch lever 4, plunger 12, and cantilever 6 form a 4-bar linkage with the fourth element being the body 2 to which the latch lever 4 and cantilever 6 are pinned. The plunger 12 is configured such that, over the range of motion of the memory alloy wire actuator 20, the plunger 12 moves approximately along the line of action of the memory alloy wire actuator 20. This reduces side-to-side angular displacement of the memory alloy wire 24 and improves the operational life of the memory alloy wire actuator 20 and keeps the portions 24A, 24B (further described in relation to FIG. 8) of the memory alloy wire actuator 20 equal to prevent slippage of the memory alloy wire 24 around the capstan 13.

In operation, lid 50 is released when a current is passed through memory alloy wire actuator 20. The memory alloy wire 24 contracts due to the conversion from its martensite form to its austenite form caused by heating induced by the current passing through the resistance of the memory alloy wire 24. This contraction force is applied to capstan 13 in the direction opposing the forces applied by plunger 12 and cantilever 6. As the memory alloy wire 24 contracts, capstan 13 moves to the left causing latch lever 4 and cantilever 6 to rotate counterclockwise, releasing the lid hook 52, which allows the lid 50 to open under the influence of the lid springs (not shown). When the opening of the lid 50 is detected by a lid sensor (not shown) the current through memory alloy wire 24 is shut off.

Figure 3:
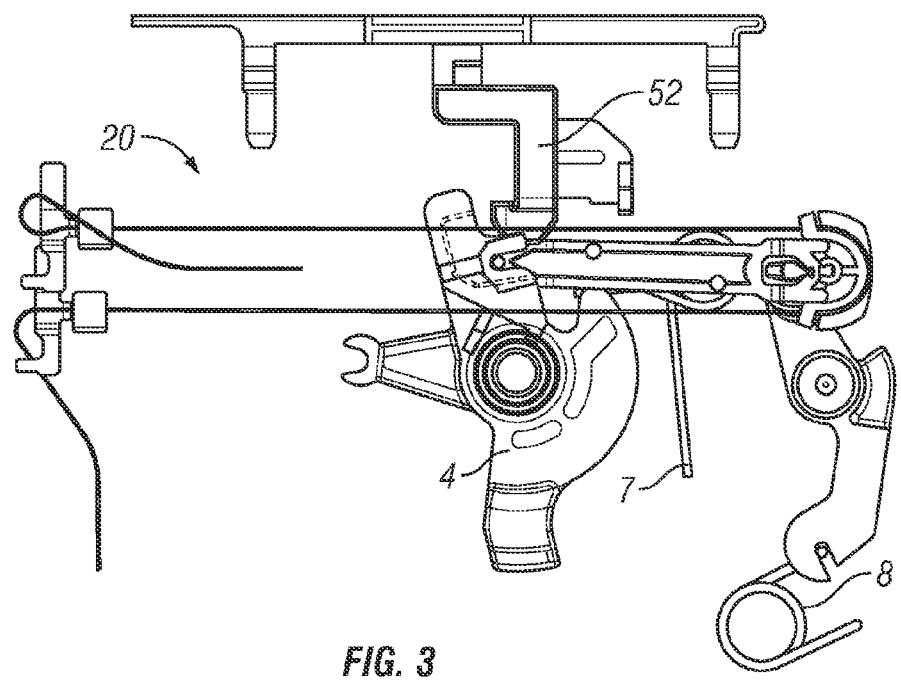
FIG. 3 depicts the lid release mechanism of FIG. 1 in the unlatched position according to certain aspects of this disclosure.

FIG. 3 depicts the latch release mechanism 10 of FIG. 2 in the unlatched position according to certain aspects of this disclosure. In this example, the memory alloy wire actuator 20 has sufficient current flowing through the memory alloy wire 24 from an external circuit (not shown) to cause the memory alloy wire 24 to contract approximately 2%, which is a commonly used target contraction value for memory alloy wire. In certain embodiments, the memory alloy wire 24 contracts 3.5%. The contraction has overcome the force applied by the plunger 12 and cantilever 6 and displaced capstan 13 and plunger 12 to the left, rotating latch lever 4 sufficiently to disengage lid hook 52 and thereby release lid 50. In this example, the lid 50 is spring-loaded and the lid 50 will self-open upon release of lid hook 52.

Figure 4:
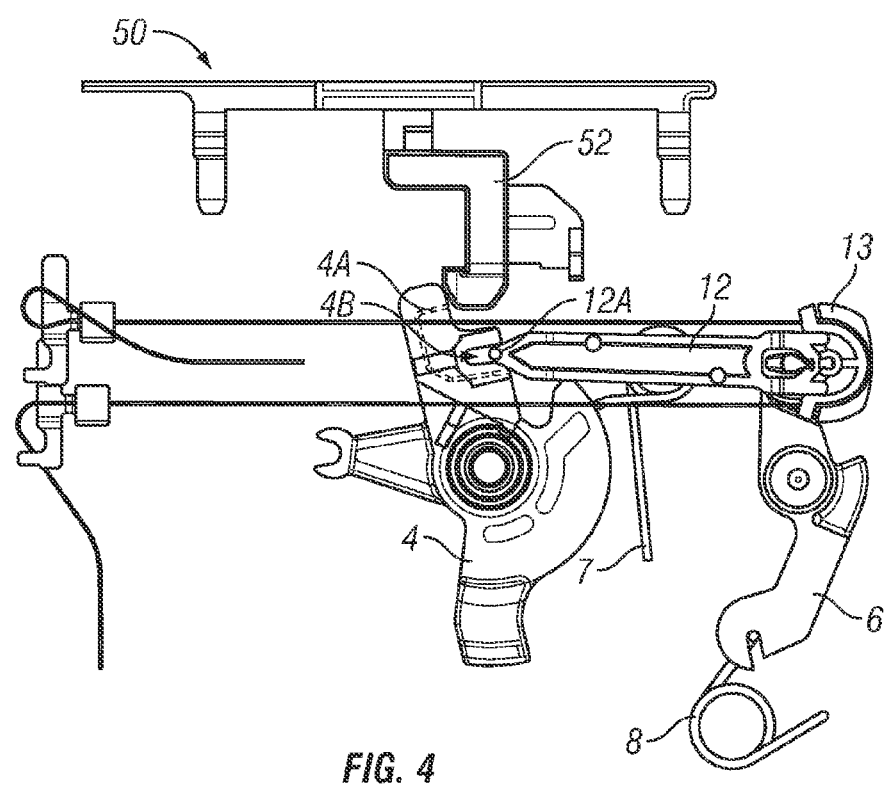
FIG. 4 depicts the lid release mechanism of FIG. 1 as the lid is being closed according to certain aspects of this disclosure.

FIG. 4 depicts the latch release mechanism 10 of FIG. 1 as the lid 50 is being closed according to certain aspects of this disclosure. As the lid 50 closes, the angled underside of lid hook 52 comes into contact with the top corner of latch lever 4, rotating the latch lever 4 counterclockwise. This rotation compresses spring 7 but does not pull plunger 12 to the right, as the engagement of plunger 12 with latch lever 4 is through pin 12A which fits into slot 4B. While clockwise rotation of latch lever 4 applies a compressive force to plunger 12 through pin 12A, counterclockwise rotation does not create a tension force in plunger 12 as pin 12A is not attached to latch lever 4. As latch lever 4 rotates counterclockwise, the slot 4B pulls away from pin 12A, which is maintained in its original position by the force applied by the cantilever 6 to the other end of plunger 12. Slot 4B is long enough that pin 12A does not disengage from the slot 4B as the lid closes.

The force applied by cantilever 6 maintains tension in the memory alloy wire 24 while the lid is being closed, which is the primary function of cantilever 6 and cantilever spring 8. Without cantilever 6 and cantilever spring 8, the tension in memory alloy wire 24 would go to zero as the latch lever 4 rotates during lid closure, which removes the compressive force applied to plunger 12. In addition, without cantilever 6 and cantilever spring 8, the memory alloy wire 24 would be subjected to a shock load when the lid hook 52 passes below the lid hook 4A, as the latch lever 4 would snap back to its original position under the influence of spring 7. Both the repeated loss of tension and the shock load that would be experienced by memory alloy wire 24 upon each lid closure are detrimental to the operational lifetime of memory alloy wire.

Figure 5:
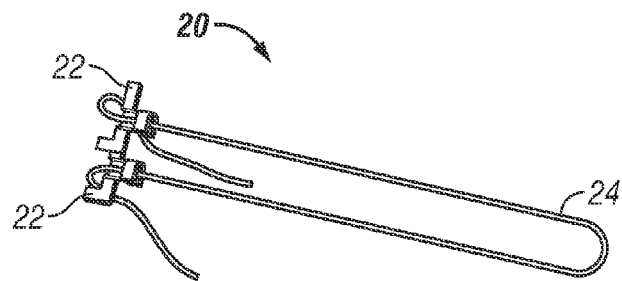
FIG. 5 depicts a memory alloy wire actuator according to certain aspects of this disclosure.

FIG. 5 depicts a memory alloy wire actuator 20 according to certain aspects of this disclosure. In this embodiment, the memory alloy wire actuator 20 comprises a length of memory alloy wire 24 with a terminal 22 attached at each end. It can be seen that, in this embodiment, the memory alloy wire 24 extends past each of the terminals 22 such that each end of the memory alloy wire 24 can separately and independently be connected to a contact of electrical circuit. Thus, terminal 22 provides only the mechanical attachment function and is decoupled from the electrical contact function. As the contraction of the memory alloy wire 24 is only a few percent, the distance between the terminals must be precisely controlled to ensure that the latch hook 4A is properly located to engage lid hook 52 and able to disengage the lid hook 52 within this limited amount of displacement. The memory alloy wire actuator 20 is formed into the "U" shape to provide twice the actuation force of a single wire. The separation of the mechanical and electrical termination functions allow for the optimization of the reliability of the mechanical termination.

Figure 6A:
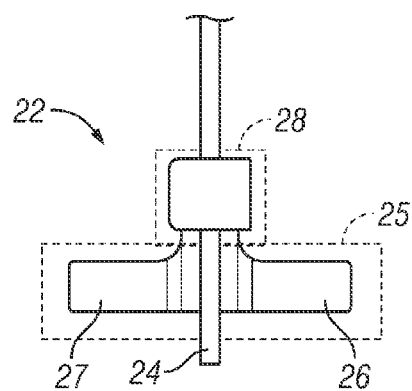
FIGS. 6A-6C depict an exemplary memory alloy wire terminal according to certain aspects of this disclosure.
Figure 6B:
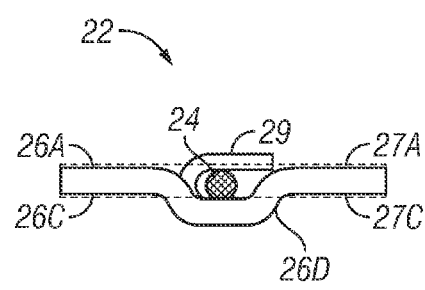
Figure 6C:
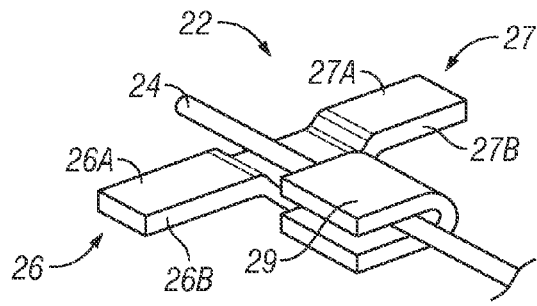

FIGS. 6A-6C depict an exemplary memory alloy wire terminal 22 according to certain aspects of this disclosure. FIG. 6A is a plan view of a terminal 22 having the same features as the ones that are shown as part of the memory alloy wire actuator 20 of FIG. 5. Terminal 22 includes a crosspiece 25 and an extended piece 28, as indicated by the dashed line boxes. Crosspiece 25 includes two wings 26 and 27 that are joined at the center and extend away from each other and perpendicular to the memory alloy wire 24. The extended piece 28 is attached to the center of crosspiece 25 and extends perpendicular to wings 26 and 27. In this example, the wings 26 and 27 and the extended piece 28 are formed from a single piece of metal. In certain embodiments, other wire attachment means are utilized, such as the extended piece 28 being a separate element that is coupled to the crosspiece 25.

FIG. 6C is a perspective view of the terminal 22 of FIG. 6A. Wings 26 and 27 have top surfaces 26A and 27A, respectively, that lie in a common plane. Wings 26 and 27 also have front surfaces 26B and 27B, respectively, that are adjacent to the top surfaces and lie in their own common plane. It is visible in this view that this embodiment of extended piece 28 includes a crimp element 29 that has been folded over to capture and retain memory alloy wire 24. In certain embodiments, the extended piece 28 includes a separate attachment element, such as a crimp ring (not shown) that couples the memory alloy wire 24 to the terminal 22.

FIG. 6B is an end view of the terminal seen in FIG. 6A. It can be seen that the top surfaces 26A and 26B, seen on edge in this view, lie in a common plane that is perpendicular to the page. Wings 26 and 27 also have bottom surfaces 26C and 27C that lie in a common plane that is approximately parallel to the plane of surfaces 26A-27A. Terminal 22 has an effective cross-section area 26D that is defined as the area in the front surface plane 26B-27B that is between the common top plane 26A/27A and the common bottom plane 26C-27C and bounded on the sides by the ends of wings 26 and 27. Area 26D is indicated in FIG. 6B by the dashed line box, wherein the box is shown as slightly larger than the area defined above to improve the visibility of the box and is intended only to show the general area defined above. It can be seen that, in this embodiment, extended piece 28 is offset relative to wings 26 and 27 such that the cross-section of memory alloy wire 24, when held in place by crimp 29, overlaps the effective cross-section 26D when the cross-section is projected onto the common front plane along a line that is perpendicular to the cross-section. In certain embodiments, a line extended from the point of coupling between the memory alloy wire 24 and the terminal 22 and in the direction of the centerline of memory alloy wire 24 at that point passes through the area 26D. In certain embodiments, terminal 22 is formed from a sheet that is thicker than memory alloy wire 24 and the entire projected cross-section of memory alloy wire 24 lies within area 26D.

Figure 7:
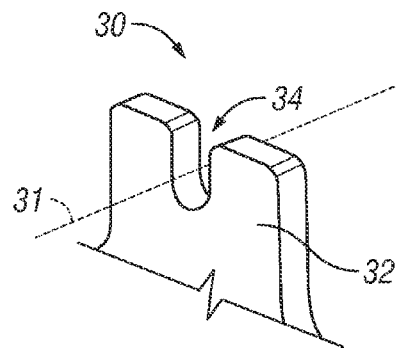
FIG. 7 depicts a retention feature of a memory alloy wire actuator assembly according to certain aspects of this disclosure.

FIG. 7 depicts a retention feature 30 of a memory alloy wire actuator assembly 40 of FIG. 8 according to certain aspects of this disclosure. The retention feature 30 is, in this example, formed as part of a base structure (not shown) such as the body 2 of FIG. 1. In certain embodiments, the retention feature 30 is a separate part that is coupled to the base structure. Axis 31 is the line of action of a memory alloy wire actuator 20 (not shown) and surface 32 is perpendicular to axis 31. A notch 34 is formed in retention feature 30 such that the axis 31 approximately passes through the notch 34. The structure of retention feature 30 is sufficiently strong to resist breakage or bending sufficient to allow the terminals 22 to slide off the retention feature 30 under the influence of the compressive force applied by the memory alloy wire actuator 20 to surface 32. In certain embodiments, a notch (not shown) is provided on the surface 32 where the terminal 22 will contact the surface 32 to assist in locating and retaining the terminal 22 in the desired position. In certain embodiments, other types of positioning and retention features, such as posts and tabs, are provided on or near surface 32.

FIG. 8 illustrates an exemplary memory alloy wire actuator assembly 40 acting on an actuation feature 42 according to certain aspects of this disclosure. Actuation feature 42 is constrained to move approximately along the line of action 31 of memory alloy wire actuator 20. Actuator assembly 40 includes a memory alloy wire actuator 20 and, in this embodiment, a retention feature 30 having two notches. In certain embodiments, this would be implemented as two retention features each having one notch each. Terminals 22 of the memory alloy wire actuator 20 are coupled to the retention feature 30. In this embodiment, the memory alloy wire 24 passes from one terminal 22 around an actuation feature 42, which is a part of a separate mechanism (not shown), and back to the second terminal 22. Actuation feature 42 is movable coupled to a base structure (not shown) to which retention feature 30 is fixedly coupled. In this example, actuation feature 42 moves in a circular path about a pivot point (not shown) of the separate mechanism. The tangent to this circular path at the actuation feature 42 is approximately aligned with the line of action 31. The length of the memory alloy wire 24 can be divided into a first portion 24A between the first terminal 22 in the actuation feature 42 and a second portion 24B and between the actuation feature 42 and the second terminal 22. In this embodiment, portions 24A and 24B are substantially parallel to each other and of the same length. This configuration provides for twice the actuation force of a single link of memory alloy wire 24 between the actuation feature 42 and a retention feature 30. In certain embodiments, portions 24A and 24B are at an angle to each other as may be required by the geometry of the installation.

In this embodiment, a preload force is applied to the memory alloy wire actuator 20 by actuation feature 42, the force applied in the direction away from the retention feature 30. The terminals 22 are held in position against retention feature 30 by this preload force. As the terminals 22 are not held fixedly in place against the surface 32 of retention feature 30, the terminals 22 can rotate about the line of contact between the front faces 26B, 27B and the surface 32. If the terminals 22 were held fixedly in place, as is common to current applications of memory wire, and the direction of the memory alloy wire 24 at the point of coupling to the terminals 22 was not aligned with the line of action 31, the tension in memory alloy wire 24 caused by the preload would bend the wire at the edge of terminal 22 and cause a local stress concentration. This stress concentration is detrimental to the life of current memory alloy wire actuators. The ability of the embodiments of terminal discussed herein to rotate about the line of contact allows the terminal to align with the memory alloy wire 24 and avoid this stress concentration, thereby extending the life of the memory alloy wire actuator 20 compared to current designs.

FIGS. 9A-9D illustrate the operation of a self-aligning terminal 22 of a memory alloy wire actuator assembly 40 according to certain aspects of this disclosure. FIG. 9A is a cross-section of the retention feature 30 through the center of notch 34, where the white region is the notch and the hatched section below is the cut though the body of retention feature 30. Surface 32 is visible as the left edge of retention feature 30. Terminal 22 is shown without sectioning. The end of wing 26 is visible facing the observer and is shaded in FIGS. 9A and 9B to enhance its visibility. Wing 27 is directly behind wing 26 in this view, and the front surfaces 26B and 27B are visible as the right edge of wings 26, 27 in this view. The line of contact between the front faces 26B, 27B and the surface 32 is perpendicular to the page in the view of FIG. 9A.

The extended piece 28 is indicated by the dashed line box that includes the crimp element 29. Memory alloy wire 24 is crimped between the crimp element 29 and the lower portion of extended element 28. This point of coupling between the memory alloy wire 24 and the terminal 22 can be seen to be, in this view, to the right of the line of contact between the front surfaces 26B, 27B of terminal 22 and surface 32 of retention feature 30. This is a stable orientation of terminal 22 if the line of action 31 from FIG. 8 is aligned with the line of action 44 shown in FIG. 9A, and therefore no stress concentration is created in this configuration.

FIG. 9B illustrates what would happen if a terminal 22X did not rotate when the line of action 44A of a memory alloy wire 24X changed. In this view, the memory alloy wire 24X is deflected and now has a line of action 44A that is at an angle to the axis 44 with which the terminal 22X remains aligned. It should be emphasized that this situation is not the behavior of the claimed terminal 22 and memory alloy wire actuator 20. Rather, this is what would occur with the fixed terminals of current memory wire devices and is presented to emphasize the advantage provided by the claimed terminal 22 and memory alloy wire actuator 20. Since the terminal 22X is at an angle to the memory alloy wire 24X, the memory alloy wire 24X has a sharp bend at corner 45. There will be a stress concentration at this corner. Whether this stress concentration is constant or cyclic, which would be the situation if the line of action 44A shifted during each cycle, this is detrimental to the operational life of memory alloy wire 24X.

FIG. 9C illustrates another termination configuration, wherein the plane of the memory alloy wire 24 is perpendicular to the surface 32 of retention feature 30 and aligned with the line of action 44 but the plane of the terminal 22 is at an angle to the memory alloy wire 24. The terminal 22 has pivoted around the front faces 26B, 27B of wings 26, 27. The bend of the memory alloy wire 24 at the front of the extended element 28 creates the same stress concentration as present in the configuration of FIG. 9B with the same detrimental effect.

FIG. 9D depicts the situation wherein the line of action 31 of FIG. 8 is inclined with respect to the retention feature 30 as indicated by line of action 44A. The retention feature is not sectioned in FIG. 9D to better show the contact between the front surfaces 26B, 27B and surface 32. In this situation, a lateral force is applied to the terminal 22 at the point of coupling between the memory alloy wire 24 and the extended element 28 by the tension in the angled memory alloy wire 24. This lateral force is a downward vertical force in the view of FIG. 9A, and the resultant opposing force would be an upward vertical force generated at the line of contact between the front surfaces 26B, 27B and surface 32. The combination of the applied lateral force and the resultant opposing force applies a clockwise torque to the terminal 22, causing the terminal 22 to rotate clockwise about the line of contact between the front surfaces 26B, 27B and surface 32. FIG. 9D depicts the position of terminal 22 with respect to retention feature 30 after terminal 22 has rotated in response to tension in memory alloy wire 24 aligned with line of action 44A. It can be seen that terminal 22 and memory alloy wire 24 remain aligned with each other as they have rotated to align with line of action 44A. This rotation of terminal 22 prevents a concentration of stress at the crimp between extended element 28 and memory alloy wire 24.

While the amount of contraction of the memory alloy wire actuator 20 is small, there may be motion of actuation feature 42 during the contraction that produces a change in the angle of the line of action 44A. The offset between the point of coupling between the extended element 28 and memory alloy wire 24 and the line of contact between the front surfaces 26B, 27B and surface 32 will always produce a torque on terminal 22 that rotates the terminal 22 to align with the new line of action 44A. This self-aligning feature prevents cyclic stress that would be present if the memory alloy wire 24 were to bend at the edge of extended element 28 with every cycle of contraction, again extending the life of the memory alloy wire actuator 20 compared to current designs. Cyclic stress can also occur if the angular offset as shown in FIG. 9B or 9C were to stay constant due to variations of the force on the muscle wire acting on the stress concentration where the memory alloy wire 24 bends as it meets the terminal 22.

Figure 10:
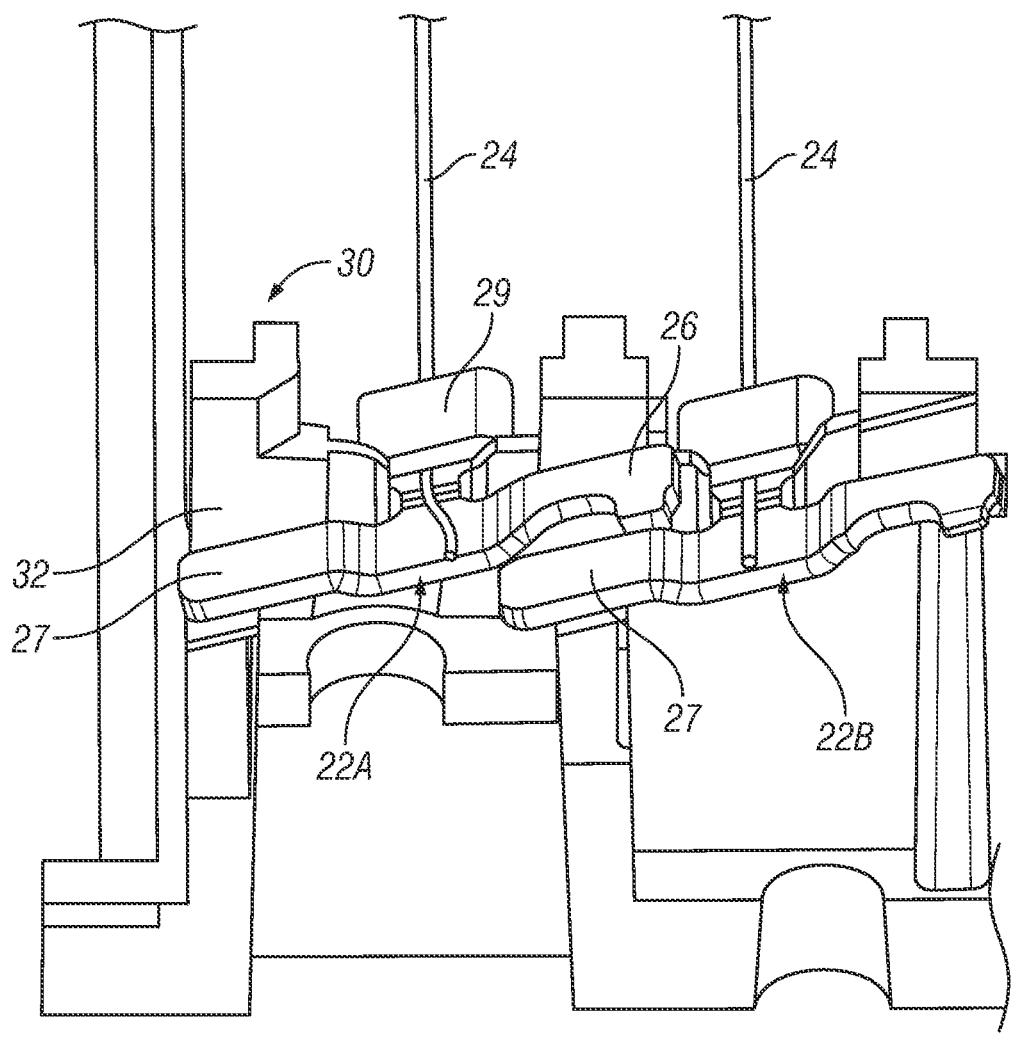
FIG. 10 illustrates an exemplary retention feature configured to position the self-aligning terminals parallel to and offset from each other according to certain aspects of this disclosure.

FIG. 10 illustrates an exemplary retention feature 30 configured to position the self-aligning terminals 22 parallel to and offset from each other according to certain aspects of this disclosure. This perspective view is looking from the terminals 22 along the line of action of the memory alloy wire actuator 20 such that memory alloy wires 24 run up and out of the view. It can be seen that both terminals 22A and 22B are angles such that wing 26 of terminal 22A overlaps wing 27 of terminal 22B. This configuration provides a more compact memory alloy wire actuator 20, as the space between the memory alloy wires 24 is reduced compared to a configuration in which the terminals 22A and 22B do not overlap. Although the plane of the self-alignment capability of the terminals 22 is also inclined, this has no effect on self-alignment when the face 32 of the retention feature 30 is perpendicular to the memory alloy wire 22, avoiding the situation illustrated in FIG. 9C. The effect in correction is small for the situation of FIG. 9B, provided that the angle of inclination is kept small.

Figure 11:
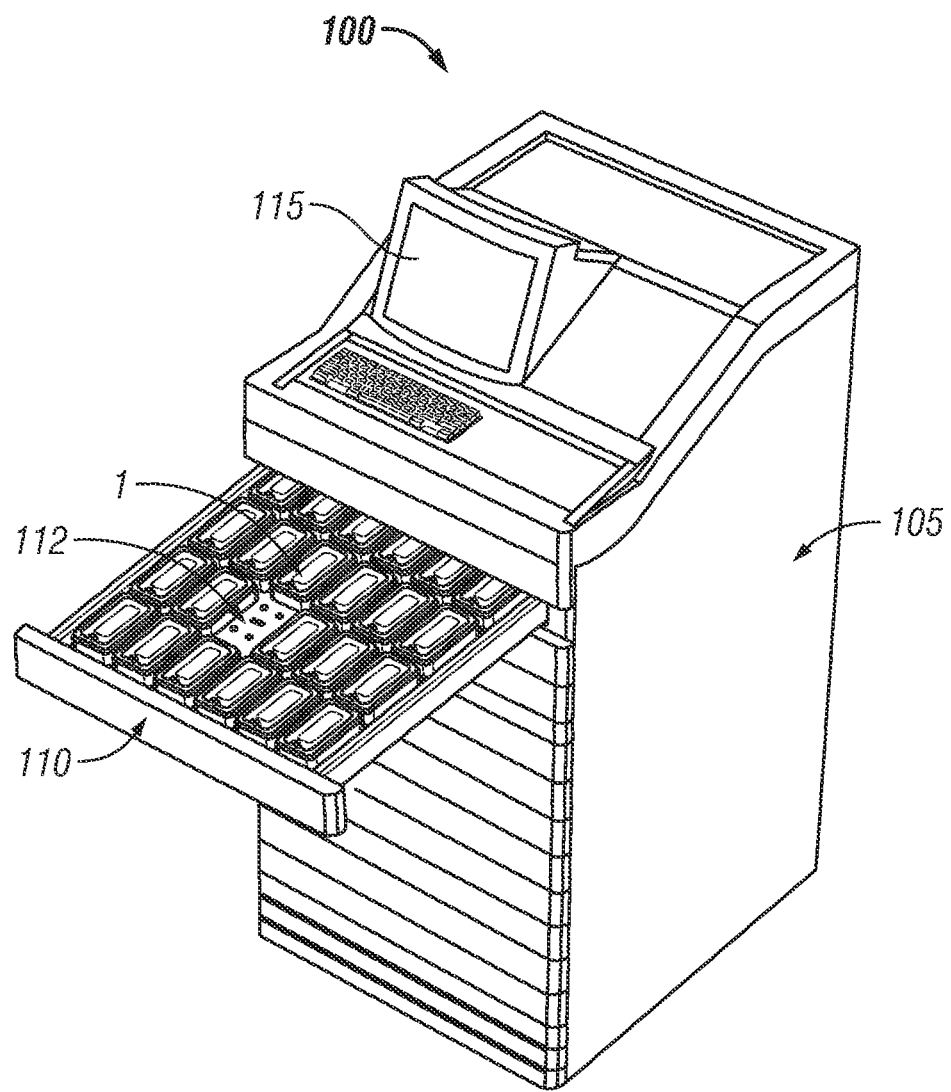
FIG. 11 illustrates an exemplary ADM that includes removable lidded containers that include memory alloy wire actuators according to certain aspects of this disclosure.

FIG. 11 illustrates an exemplary ADM 100 that includes removable lidded containers 1 that include memory alloy wire actuators 20 according to certain aspects of this disclosure. The ADM 100 includes a cabinet 105 with a controller 115 that is, in this example, housed in the top structure of the ADM 100. The controller includes a processor with a memory (not shown), a display, a keyboard and touchscreen input devices, a power supply (not shown), and communication modules (not shown) that couple the processor to the internal components of the ADM and to external networks. In certain embodiments, the ADM includes a barcode scanner (not shown) that is fixedly or removably mounted to the top structure or cabinet. The ADM also includes a drawer 110 that is configured to accept the lidded containers 1 from FIG. 1, wherein the lidded containers 1 and the drawer 110 both include complementary mating connectors that couple the lidded containers to the controller when the lidded containers are accepted by the drawer. The drawer 110 has multiple locations 112 configured to accept a lidded container 1. In certain embodiments, the lidded containers are attached to fixed parts of the cabinet, such as a shelf or inclined surface. In certain embodiments, the lidded containers are not separate from the structure of the cabinet, wherein the equivalent to the body 2 of FIG. 1 is integrally formed into the structure of the cabinet. In certain embodiments, the equivalent to the body 2 of FIG. 1 is integrally formed into the structure of the drawer, wherein the compartments formed by the bodies 2 in such a structure have individual lids mounted to the common drawer structure. In certain embodiments, the cabinet 105 is a smaller structure having only a few drawers 110, wherein the storage capacity of the ADM 100 is suitable for a single patient rather than a plurality of patients. In certain embodiments, the cabinet 105 is mounted to and supported by a wall.

In summary, the disclosed memory alloy wire actuator 20 provides an increased operational life and increased amount of useable stroke compared to current memory wire devices through the ability to self-align the mechanical terminals 22 with the line of action of the memory alloy wire 24. This self-alignment eliminates stress concentrations from both misaligned components and cyclic motion of the mechanism in operation.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wire actuator comprising:
    a wire, comprising a memory alloy, having first and second ends; and
    a terminal comprising two wings and an extended piece, the two wings disposed on opposing sides of the extended piece and extending transverse to the extended piece, wherein:
        each wing comprises top and bottom surfaces, a front surface, and an outside end, wherein the top surfaces of the two wings lie in a common top plane,
        the wire is coupled to the extended piece of the terminal, and
        the front surface of each wing is configured to freely rotate about a line of contact between the front surfaces of each wing and a retention feature fixed to a base structure in response to a torque generated when the memory alloy wire shrinks.

2. The wire actuator of claim 1, wherein the extended piece is connected to the two wings in a T-shape.

3. The wire actuator of claim 1, wherein the wire is coupled to the extended piece at the first end of the wire.

4. The wire actuator of claim 1, wherein the front surfaces of the two wings are coplanar.

5. The wire actuator of claim 1, wherein the two wings extend perpendicular to the extended piece.

6. The wire actuator of claim 1, wherein the wire is coupled to the terminal by crimping.

7. The wire actuator of claim 1, wherein:
    the wire has a central axis along the center of the wire and a straight line that is tangent to the central axis at a point where the wire is coupled to the terminal;
    the terminal has an effective cross-section along a common front plane that is common to the front surfaces of the two wings, the cross-section extending from the common top plane of the wings to a bottom plane that is coincident with the bottom surfaces of the wings and bounded on the sides by the outside ends of the wings; and
    the extended piece is offset from the common top plane of the wings such that the straight line passes through the effective cross-section of the terminal.

8. The wire actuator of claim 1, further comprising a first and a second ends of the wire, wherein the first and second ends of the wire are coupled to a first and a second terminals.

9. The wire actuator of claim 8, wherein the ends of the wire extend past the terminals such that the ends of the wire can be connected to contacts of an electrical circuit.

10. A memory wire actuator assembly comprising:
    a memory alloy wire actuator comprising:
        a memory alloy wire having first and second ends; and
        a terminal comprising two wings and an extended piece, the two wings disposed on opposite sides of the extended piece and transverse to the extended piece, wherein each wing comprises a top surface that lies in a common top plane, and a front surface, and wherein the memory alloy wire is coupled to the extended piece of the terminal; and
    a retention feature comprising:
        a planar surface; and
        a notch that passes through the planar surface, wherein:
            the front surfaces of the wings of the terminal contact the planar surface of the retention feature such that the extended piece of the terminal passes through the notch, and
            the front surfaces of the wings of the terminal are configured to freely rotate about a line of contact between the front surfaces of each wing and a retention feature in response to a torque generated when the memory alloy wire shrinks.

11. The actuator assembly of claim 10, further comprising a first and a second ends of the wire, wherein the actuator assembly is configured to apply a force to an actuation feature of a mechanism, further wherein:
    first and second terminals are coupled to the first and second ends of the memory allow wire;
    the actuator assembly comprises first and second retention features; and
    the memory alloy wire is configured such that the first and second terminals are coupled to the first and second retention features, respectively, and the memory alloy wire passes from the first terminal around the actuation feature to the second terminal such that contraction of the memory alloy wire applies force to the actuation feature.

12. The actuator assembly of claim 11, wherein the first and second ends of the memory alloy wire extend past the respective terminals such that the memory alloy wire can be connected to contacts of an electrical circuit.

13. The actuator assembly of claim 11, wherein the memory alloy wire has a first portion between the first terminal and the actuation feature and a second portion between the actuation feature and the second terminal, and wherein the first portion is substantially parallel to the second portion.

14. The actuator assembly of claim 13, wherein the first and second portions of the memory alloy wire each have a length, the lengths of the first and second portions being substantially the same.

15. The actuator assembly of claim 13, wherein:
the actuation feature comprises a capstan,
the memory alloy wires wrap around a portion of the capstan, and
the capstan is configured not to rotate as a rotating element moves from a first position to a second position such that the memory alloy wire does not slide relative to the capstan.

16. The actuator assembly of claim 13, wherein the actuation feature comprises a pre-tensioning element configured to apply a force to the actuator assembly such that the memory alloy wire is continuously under tension.

17. The actuator assembly of claim 11, wherein the first and second retention features and the respective terminals are configured such that the planes of the top surfaces of the first and second terminals are parallel to each other.

18. The actuator assembly of claim 17, wherein the first and second retention features and the respective terminals are configured such that the planes of the top surfaces of the first and second terminals are offset from each other.

19. An Automated Dispensing Machine (ADM), comprising:
a cabinet;
a plurality of lidded containers coupled to the cabinet, each container comprising a securable lid having a closed position and an open position, and a latch release mechanism configured to releasably secure the lid in the closed position, the latch release mechanism comprising a memory alloy wire actuator configured to cause the latch release mechanism to release the lid from the closed position and allow the lid to move to the open position, the memory alloy wire actuator comprising:
a memory alloy wire having first and second ends; and
a terminal comprising two wings and an extended piece, the two wings disposed on opposing sides of the extended piece and transverse to the extended piece, wherein each wing comprises a top surface that lies on a common top plane and a top surface, wherein the memory alloy wire is coupled to the extended piece of the terminal, and wherein the top surface of each wing is configured to freely rotate about a line of contact between the front faces of each wing and a retention feature fixed to a base structure in response to a torque generated when the memory alloy wire shrinks; and
a controller coupled to the cabinet and the lidded containers, the controller configured to actuate the memory alloy wire actuator of a selected container upon receipt of a command to open the lid of the selected container.

20. The ADM of claim 19, further comprising at least one drawer slidably mounted in the cabinet, wherein:
the lidded containers are removable from the ADM;
the drawer is configured to accept the removable containers; and
the lidded containers and the drawer each comprise complementary mating connectors that couple the lidded containers to the controller when the lidded containers are accepted by the drawer.

* * * * *